United States Patent
Liepold et al.

(10) Patent No.: US 7,581,976 B2
(45) Date of Patent: Sep. 1, 2009

(54) BULKHEAD CONNECTOR

(75) Inventors: Gerhard Liepold, Watchung, NJ (US); Dietrich Bizer, Madison, NJ (US)

(73) Assignee: GL Tool & Manufacturing Company Inc., Livingston, NJ (US)

( * ) Notice: Subject to any disclaimer, the term of this patent is extended or adjusted under 35 U.S.C. 154(b) by 49 days.

(21) Appl. No.: 11/628,516

(22) PCT Filed: Jun. 2, 2005

(86) PCT No.: PCT/EP2005/005987

§ 371 (c)(1),
(2), (4) Date: Mar. 8, 2007

(87) PCT Pub. No.: WO2005/119111

PCT Pub. Date: Dec. 15, 2005

(65) Prior Publication Data

US 2008/0136170 A1      Jun. 12, 2008

Related U.S. Application Data

(60) Provisional application No. 60/576,209, filed on Jun. 2, 2004.

(51) Int. Cl.
*H01R 13/52* (2006.01)
(52) U.S. Cl. .................................... 439/282
(58) Field of Classification Search ............... 439/278, 439/282, 586, 587; 277/616, 603; 174/100, 174/76, 50.5
See application file for complete search history.

(56) References Cited

U.S. PATENT DOCUMENTS

| | | | | |
|---|---|---|---|---|
| 4,267,401 A | * | 5/1981 | Wilkinson | 174/77 R |
| 4,301,325 A | * | 11/1981 | Hutchison | 174/76 |
| 5,235,138 A | * | 8/1993 | Shah et al. | 174/151 |
| 5,479,554 A | * | 12/1995 | Roberts | 385/135 |
| 5,861,577 A | * | 1/1999 | Tamura et al. | 174/50.56 |
| 5,920,035 A | * | 7/1999 | Haney et al. | 174/652 |
| 6,875,926 B2 | * | 4/2005 | Buekers et al. | 174/100 |

FOREIGN PATENT DOCUMENTS

| | | |
|---|---|---|
| DE | 100 06 360 | 9/2001 |
| EP | 1 022 834 | 7/2000 |
| GB | 916 461 | 1/1963 |
| GB | 2 333 818 | 8/1999 |
| WO | WO 02/088588 | 11/2002 |

* cited by examiner

*Primary Examiner*—Alexander Gilman
(74) *Attorney, Agent, or Firm*—Hoffmann & Baron, LLP; John S. Sopko

(57) ABSTRACT

The present invention relates to a bulkhead connector assembly providing a sealing arrangement for sealingly feeding a conduit between two environments. The assembly provides a first and second coupling components having a first and second surface respectively. A gap is formed between the first and second surfaces. The first coupling component has an aperture which extends between the first surface and a first environment and the second coupling component has an aperture which extends between the second surface and a second environment. Each aperture is adapted for receiving a conduit therethrough. A resiliently deformable gasket is provided to be placed into the gap and the gasket also is provided with a bore for a conduit to pass through the gasket. Means for compressing the gasket in the gap are provided to deform the gasket on compression so as to collapse the gasket bore against itself or against any conduit occupying the bore, so as to form a leak-proof seal between the apertures of the coupling components and the gasket.

13 Claims, 14 Drawing Sheets

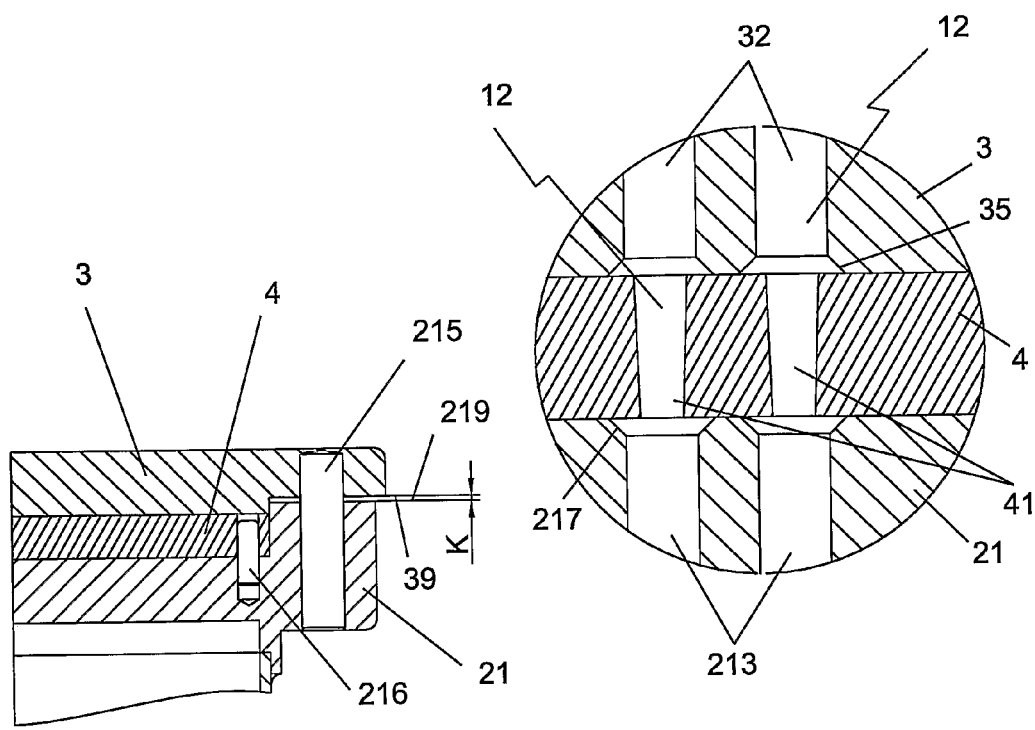
FIGURE 2
FIGURE 2a
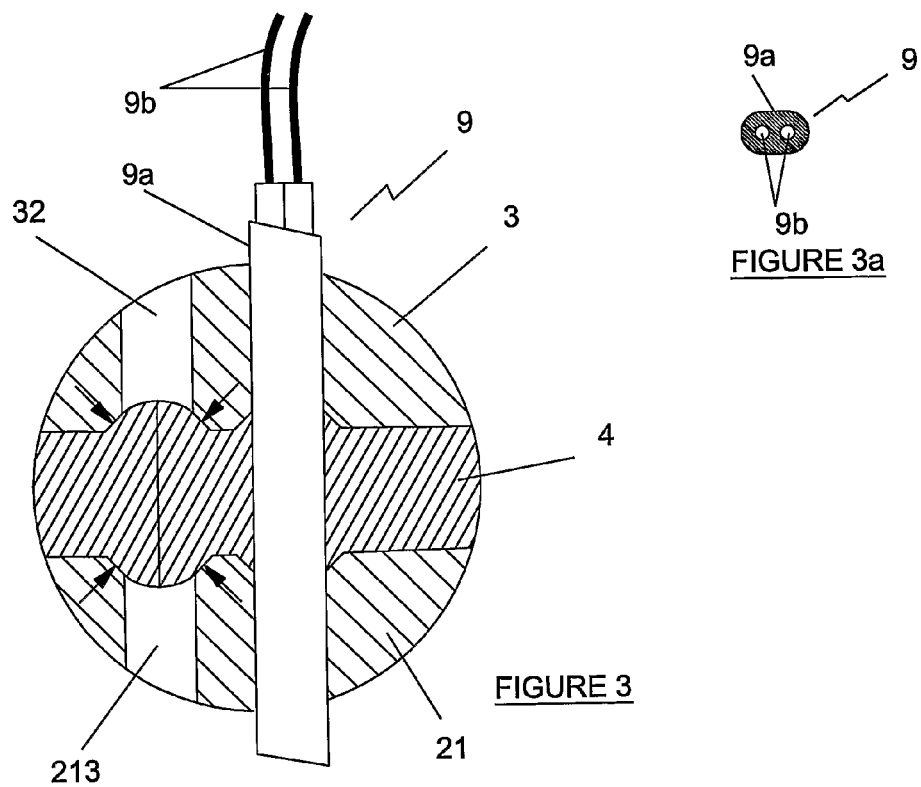
FIGURE 3
FIGURE 3a

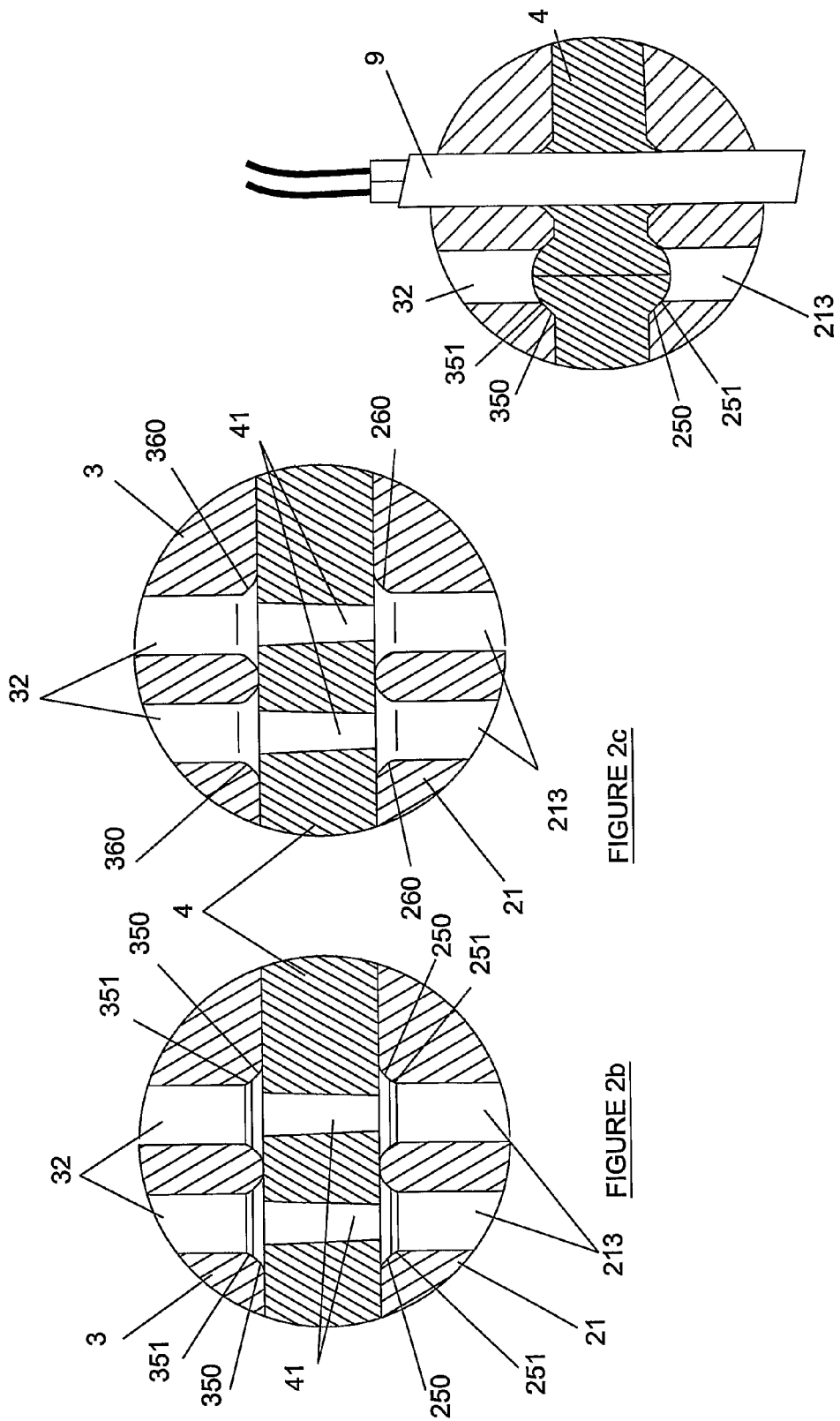

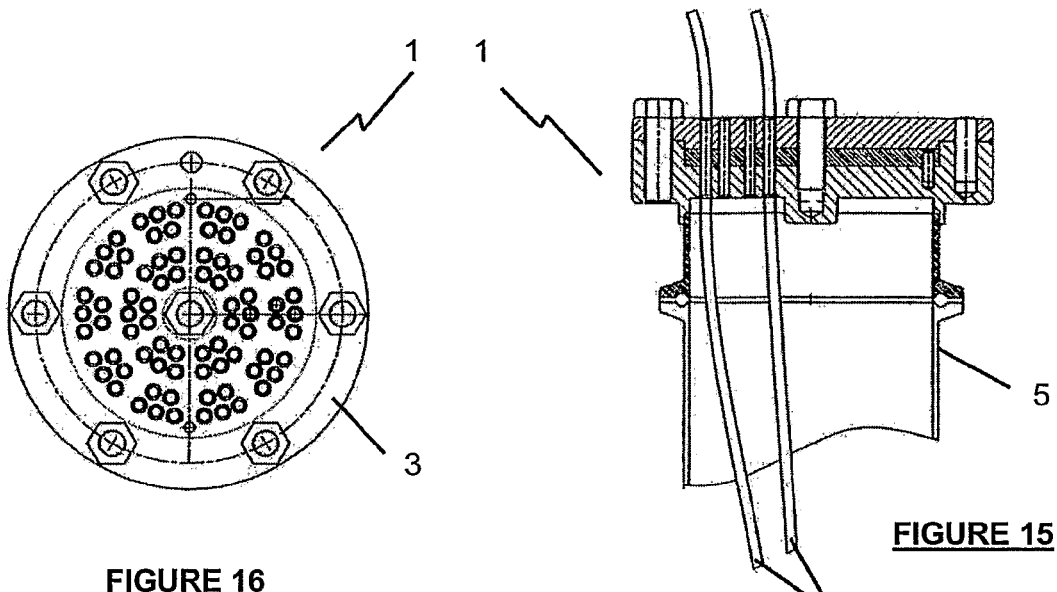
FIGURE 15
FIGURE 16
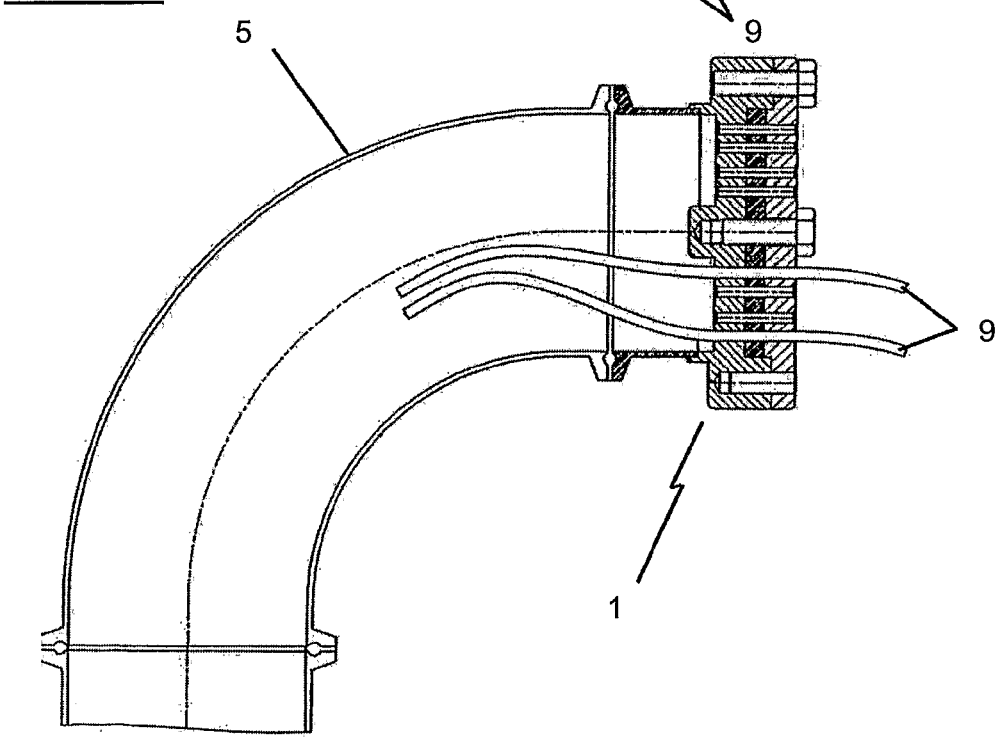
FIGURE 14

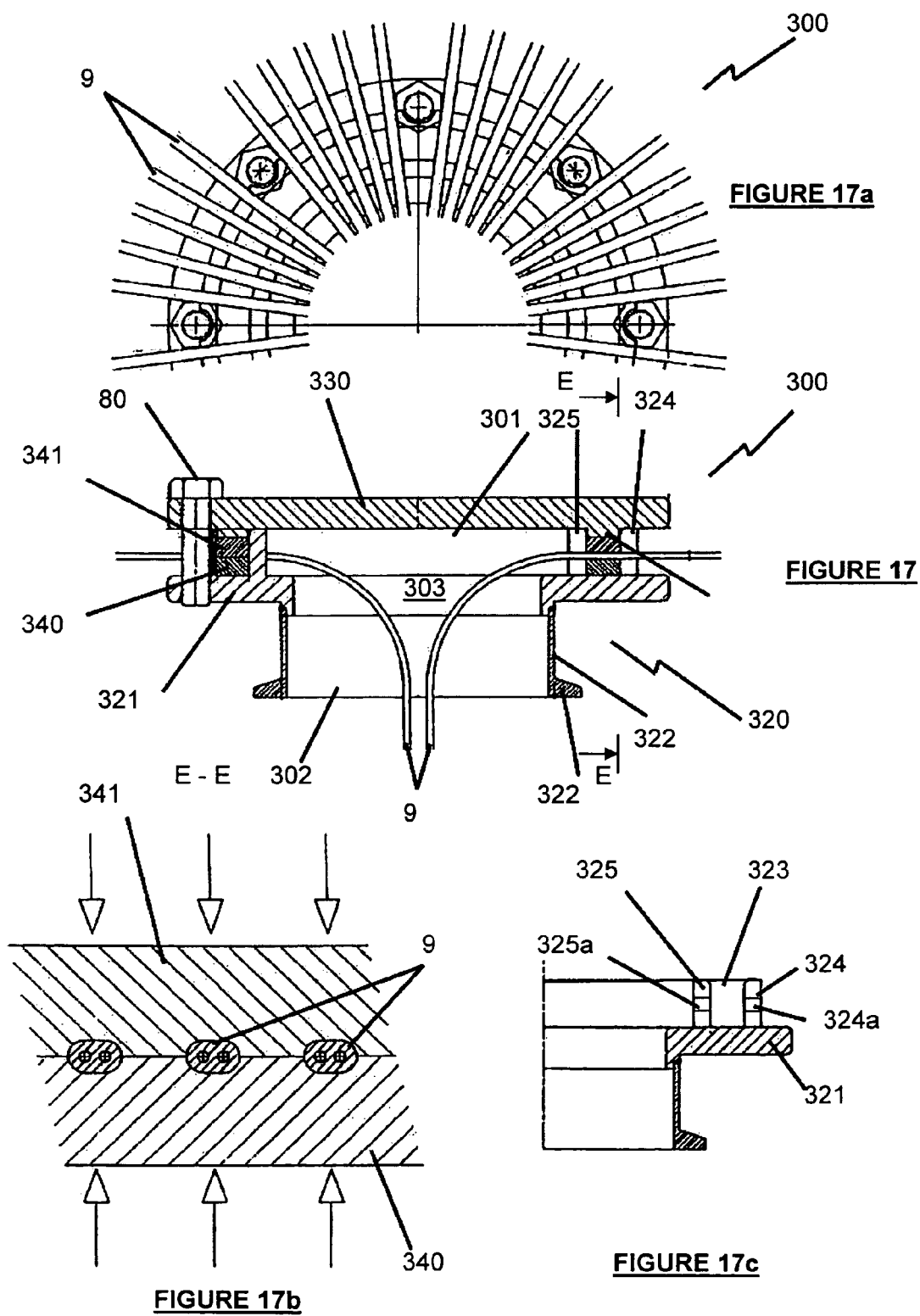

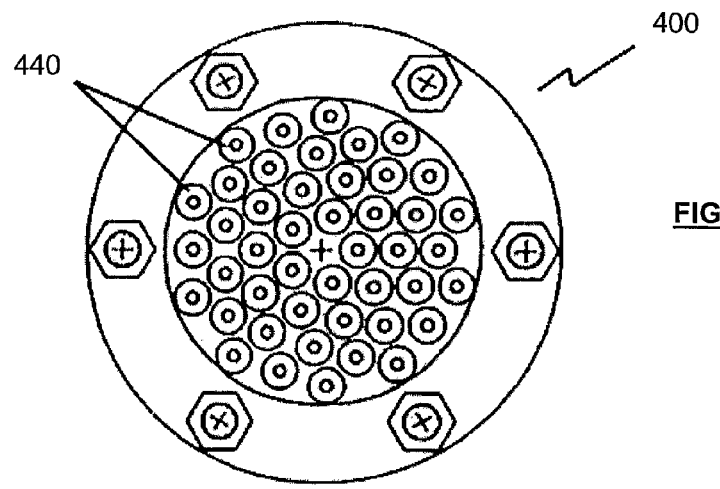
FIGURE 18a
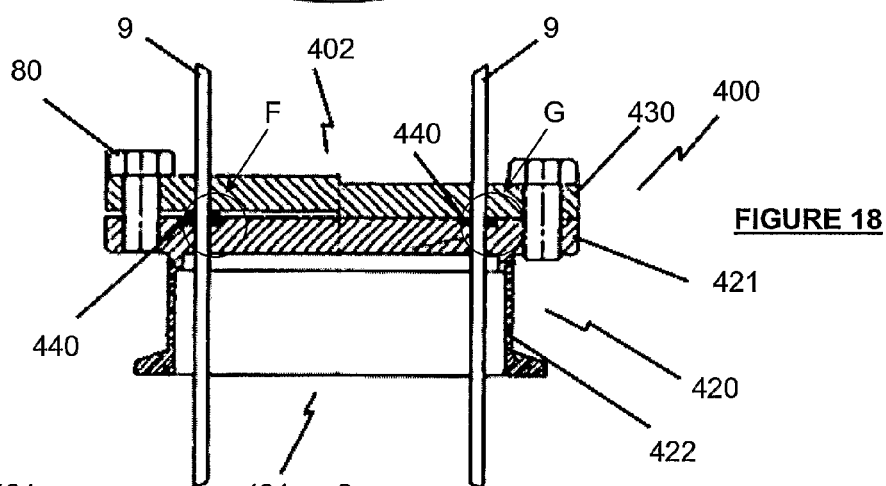
FIGURE 18
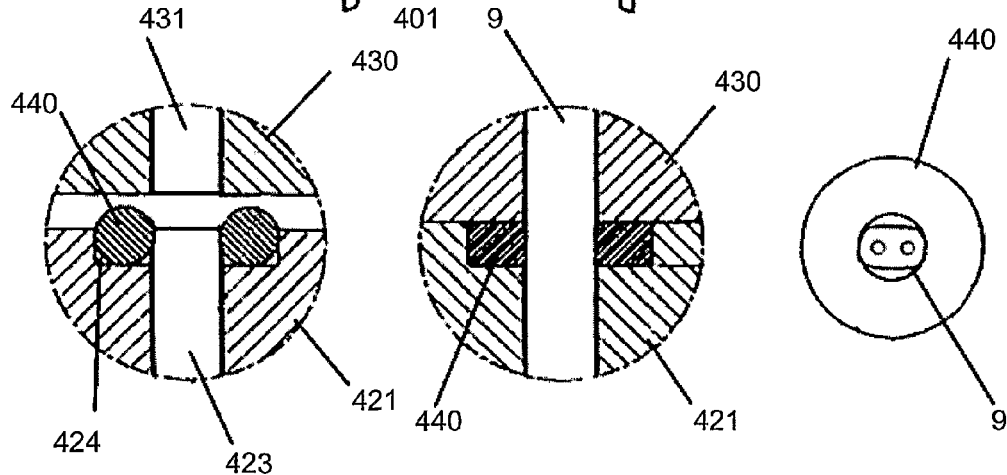
FIGURE 18b  FIGURE 18c  FIGURE 18d

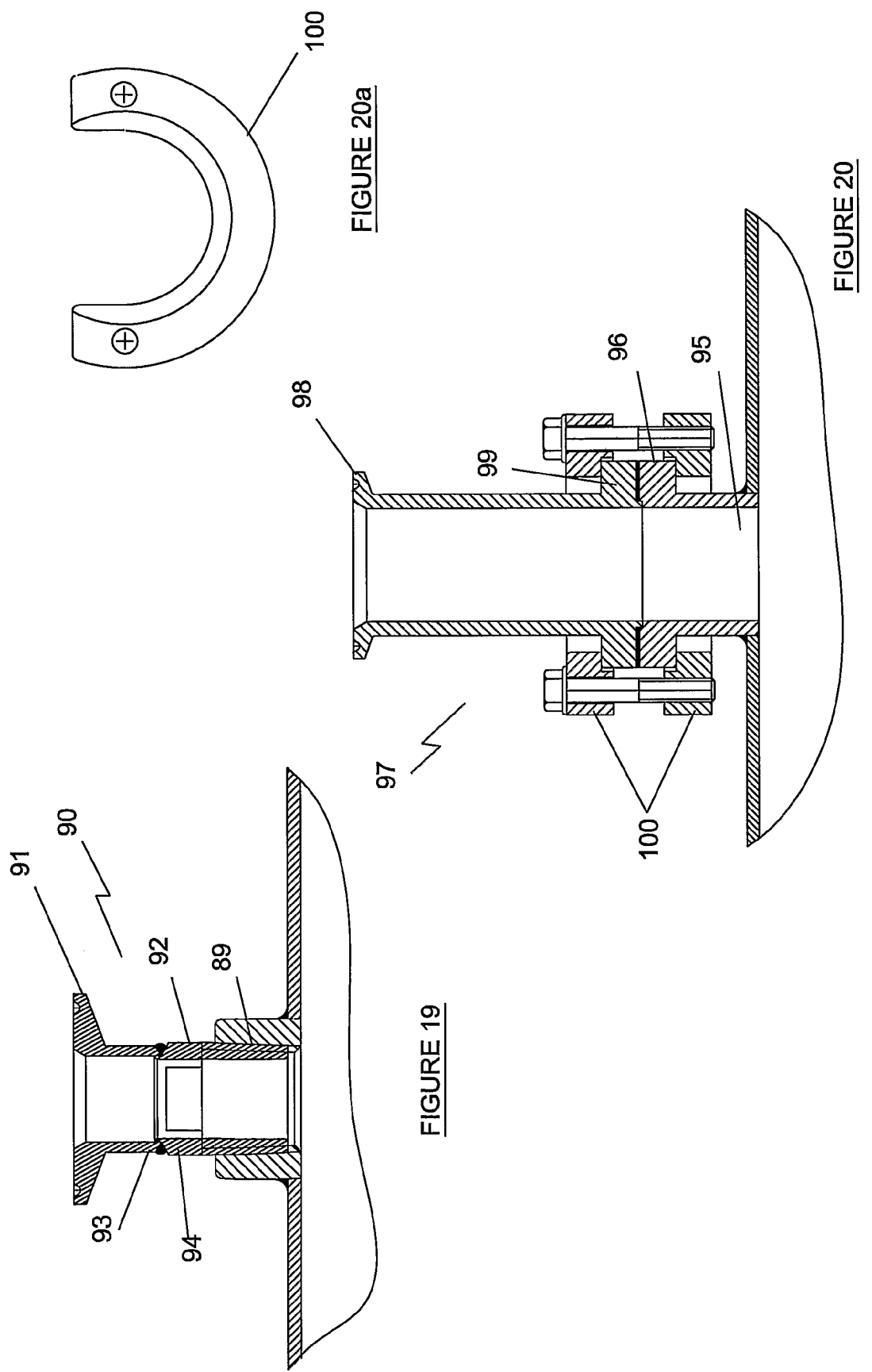

BULKHEAD CONNECTOR

CROSS-REFERENCE TO RELATED APPLICATIONS

This application is the National Stage of International Application No. PCT/EP2005/005987, filed Jun. 2, 2006, which claims the benefit of U.S. Provisional Application No. 60/576,209, filed Jun. 2, 2004, the contents of which are incorporated by reference herein.

FIELD OF THE INVENTION

The present invention relates to a bulkhead connector having a wire sealing arrangement and in particular to a bulkhead connector with a wire sealing arrangement for sealingly feeding a conduit, such as an insulated electrical conductor between two environments.

BACKGROUND OF THE INVENTION

The present invention concerns the problem of sealingly feeding conduits through a bulkhead which separates two environments having different characteristics such as different pressure, temperature, humidity etc. For example, in pharmaceutical, biotechnological or food industries, validation and accountability of equipment are vital in view of strict standards applicable in these industries. Such equipment often comprises isolation chambers in which specific conditions, such as sterility, must be maintained during the manufacturing process or a part of it. Validation of such equipment involves introducing various electronic measuring devices to ensure that the equipment provides the required conditions. It is therefore necessary for the wires of the measuring devices to pass into the isolation chamber without letting any exchange of fluids or gases occur between the isolated area and the surrounding environment. For example, in a lyophilization process, products are placed on shelves within the isolation chamber of the lyophilizer. The products are initially frozen and then dried under vacuum while heat is transferred by thermal conduction from the shelves in to the product. Accurate temperature and pressure values must be maintained in the chamber in order to achieve high quality products. For validation of lyophilisation equipment, series of thermocouples are employed in a plurality of locations within the chamber to measure the temperature of the shelves and the insulated wires of the thermocouples pass through a bulkhead which separates the surrounding atmosphere and the chamber. It is vital to ensure that no air or moisture passes along the wires of the thermocouples into the lyophilization chamber during the validation process.

Many other processes, including but not limited to sterilisation processes, equally require validation of the internal condition in the isolation chamber using sensors connected by wire between the chamber and the exterior environment via a bulkhead connector. In each case, it is necessary to ensure that the passage of the wire through the bulkhead connector does not provide any means by which cross-contamination between the isolated and external environments may occur. Other examples of processes which may involve feeding conduits between two different environments include processes such as heating of products in dry heat ovens, autoclaving or, indeed, connecting a sterile area to a non-sterile area having equal or differential pressures between the areas; including connecting various vessels or pipes.

A known technique employed to sealingly feed insulated conductors through a bulkhead employs a bulkhead which connects two different environments e. g. an isolation chamber with the external atmosphere. The bulkhead has a plurality of pre-formed through bores in which separate insulated wires are received loosely. A curable sealant is then filled into the spaces between the bores and conductor jackets thereby providing a leak-proof seal between the two environments. Such a method is described, for example, in U.S. Pat. No. 5,170,017 (Stanevich et al). A similar method is used in U.S. Pat. No. 5,831,217 (Jarvis et al).

The disadvantage of using curable sealants is that the gaps between the bores and the conductors may not be filled uniformly and therefore leakage may still occur. Another disadvantage lies in the difficulty of disassembling the wires once the sealant has cured and the run has been completed. Furthermore forming curable seals is an expensive and time consuming process.

Another known method is described in U.S. Pat. No. 5,596,176 (Everitt) which uses a combination of a sealant and a rupturable sealing gland for feeding a bundle of cables through a bulkhead. The sealing gland is fitted in an opening in a bulkhead and has a receptacle defined by a rupturable wall made from resilient elastomeric material. A bundle of cables pierces through the rupturable wall so that the elasticity of the pierced wall holds the cables of the bundle together thereby minimizing the gaps between the individual wires. A sealing compound is then potted into the receptacle. The above mentioned disadvantages associated with fluid sealants apply equally in such a system. In addition, rupturable glands are not suitable for multiple use.

A further known method is described in U.S. Pat. No. 6,215,065 (Cox). The method uses a thermoplastic grommet having an aperture for receiving a cable or a bundle of cables. The grommet is placed across a bore of a split tubular boot. A split is formed radially in the boot from the wall of the bore to the outer surface of the boot. Fasteners are provided around the outer surface of the split boot so that when the fasteners are tightened the split of the boot closes together and the walls of the boot bore compress the grommet. The grommet clamps around the cable providing a mechanical seal for the cable. The disadvantage of this method is that the force applied radially from the walls of the cable aperture of the grommet to the cable jacket has an axial component which stretches the grommet axially along the cable jacket without control thus reducing the fit of the cable aperture against the cable jacket.

Yet another prior art method is described in EP 1 049 228 A1 (Cables Pirelly) wherein a sealing device is provided for the passage of a cable between two volumes at different pressures. The device comprises a gland having a plurality of axially spaced elastomeric annular packing members. The members are compressed axially in a box so that the members clamp radially inward against the cable jacket and outward against the box. Washers are provided between the members to prevent axial expansion of the members. However, the packing member closest to the high-pressure volume has a sleeve which surrounds the cable and extends from the packing member into the high-pressure volume. A disadvantageous feature is that no external force is applied to the part of the sleeve which projects outside the box so a leak can still occur between the sleeve and the cable jacket at the free end of the sleeve.

SUMMARY OF THE INVENTION

It is an object of the present invention to seek to alleviate the aforementioned problems.

Accordingly, the present invention provides a bulkhead connector assembly for sealingly feeding a conduit between first and second environments, the connector including means for attachment to a bulkhead separating the two environments in use and comprising:
- a first coupling component having a first surface and a second coupling component having a second surface, the first and second coupling components being mutually spaced apart so as to provide a gap between the first and second surfaces, each said component having at least one aperture for receiving a conduit therethrough, such that the conduit can enter the gap via the at least one aperture of one of the two coupling components and exit the gap via the aperture of the other coupling component, the aperture of the first coupling component extending between the first surface and the first environment and the aperture of the second coupling component extending between the second surface and the second environment;
- a gasket means comprised of a resiliently deformable material positionable between the first and second surfaces about the apertures of the coupling components and defining at least one passage for a conduit to pass through the gasket means; and
- means for compressing the gasket means, the material of the gasket means being deformable on compression so as to seal against the first and second surfaces about the apertures of the coupling components and against any conduit occupying the passage to form a leak-proof seal around the exterior of the conduit to prevent any fluid from passing from one aperture to the other along the exterior of the conduit.

Ideally, the connector further comprises a housing having first and second open ends and a channel extending between the ends;
- the second end being sealingly attachable to an opening in the bulkhead leading into the second environment, the housing further comprising means for retaining the gasket means, said retaining means being adapted for receiving the gasket means so that a region of the gasket means remains exposed to the first environment.

Preferably, the compressing means comprises a cover means having an outer surface and an undersurface, the cover means being positionable over the first open end of the housing so that the undersurface of the cover means is in contact with said exposed region, and the outer surface of the cover means is exposed to the first environment; and means for securing the cover means to the housing in contact with the gasket means.

Means for adjusting the pressure exerted by the undersurface of the cover means towards the gasket means are provided.

Conveniently, the second coupling component comprises a partition located across the channel of the housing, said partition blocking said channel, the partition having a first face facing the first open end of the housing and a second face facing the second open end of the housing;
- the cover means comprises the first coupling component, said undersurface of the cover means comprising said first surface;
- the aperture of the first coupling component comprises a bore extending between the undersurface and the outer surface of the cover means; and
- the gasket means comprises a gasket sized and shaped and positionable in the gap so as substantially to occupy the gap space, the gasket passage comprising a through-bore having open ends, one end facing the first surface and the other end facing the second surface when the gasket is positioned in the gap.

Ideally, the transverse dimensions of the through-bore of the gasket are selected such that a conduit can be fed through the through-bore and the through-bore can deform on compression of the gasket so as to collapse against a conduit passing through the through-bore to form a leak-proof seal around the exterior of the conduit to prevent any fluid from passing from the aperture of the first coupling component to the bore of the cover means along the exterior of the conduit.

In a most preferred arrangement the second surface is defined by the first face of the partition the aperture of the second coupling component comprises a bore extending between the first face of the partition and the second face of the partition;
- the retaining means comprises the first face of the partition and the wall of the channel of the housing; and
- the cover means is placeable over the first open end of the housing with the undersurface of the cover means facing towards the first face of the partition so as to provide the gap defined by the first face of the partition, the wall of the channel of the housing and the undersurface of the cover means.

Most conveniently, the cover means is operable to compress the gasket axially in the gap causing the gasket to form a leak-proof seal with the undersurface of the cover means about the bore of the cover means and with the first surface of the partition about the bore of the partition and causing the gasket to expand radially towards the wall of the channel of the housing forming a leak-proof seal with said channel wall, and radially to compress it about a conduit occupying the through-bore of the gasket to form a leak-proof seal around the conduit.

Ideally, a first chamfer is provided at the opening of the bore of the partition on the first face of the partition and a second chamfer is provided at the opening of the bore of the cover means on the undersurface of the cover means, the chamfers being provided for the purpose of counterpoising pressure exerted by the gasket on compression of the gasket and redirecting said pressure toward the bore of the gasket.

In one embodiment the cover means comprises a lid and the housing includes an end face having a mating surface about its first open end and the undersurface of the lid is defined by a coupling surface for coupling with the mating surface of the housing and by a central plug portion projecting proud of the coupling surface, the plug portion being received in the first open end of the housing for compressing the gasket axially in the gap.

The bulkhead connector preferably includes means for mutually aligning the bores of the partition, the gasket and the lid in register in relation to each other, the aligning means comprising at least a first locating slot formed in the gasket and at least a first pin projecting proud of the first face of the partition towards the first open end of the housing, the first pin being engageable with said first locating slot to align the bores of the partition and the gasket; and
- at least a second pin projecting proud of the mating surface of the housing and at least a second locating slot formed on the underside of the lid, the second locating slot being engageable with the second pin to align the bores of the lid and the partition.

In a preferred arrangement in which a plurality of conduits are to be fed between the two environments, a plurality of bores is formed in each of the partition and the lid and a corresponding number of through-bores is provided in the gasket.

In a modified version of the preferred embodiment, the retaining means is comprised of at least one recess formed in the first face of the partition, the recess being defined by a base surface and an endless surrounding wall around the base surface;

the first surface is defined by said base surface;

the aperture of the first coupling component comprises a bore extending between the base surface of the recess and the second face of the partition; and the cover means is placeable over the first open end of the housing with the undersurface of the cover means facing towards the first face of the partition so as to provide the gap defined by the recess and the undersurface of the cover means.

In the modified embodiment, the cover means is operable to compress the gasket axially in the gap causing the gasket to form a leak-proof seal with the undersurface of the cover means about the bore of the cover means and with the base surface of the recess about the bore of the partition and causing the gasket to expand radially towards the endless wall of the recess forming a leak-proof seal with said wall, and radially to compress it about a conduit passing therethrough to form a leak-proof seal around the conduit. Ideally, the gasket comprises an O-ring receivable in the recess. As in the most preferred embodiment, the modified arrangement includes providing a plurality of bores formed in the partition and the cover means and a corresponding number of gaskets each having a through-bore.

Most conveniently, the partition is formed integrally with the housing.

The bore of each of the partition, the gasket and the cover means are formed so as to be positionable in register in relation to each other to form a through-way for a conduit across the bulkhead connector between the first and second environments. As in the preferred embodiment, the cover means may comprise a lid couplable with a mating surface about the first open end of the housing.

In a third arrangement of the connector of the invention the second coupling component comprises a second continuous wall projecting proud of the mating surface of the housing, the wall having a first side facing towards the periphery of the mating surface and a second side facing towards the centre of the first open end of the housing;

the second surface is defined by the first side of the first wall;

the aperture of the second coupling component comprising a bore extending between the first and the second sides of the second wall;

the first coupling component comprises a first continuous wall offset radially outwardly from the second wall and projecting proud of the mating surface of the housing, the first wall having a third side facing towards the centre of the first open end of the housing and a fourth side facing towards the periphery of the mating surface;

the first surface is defined by the third side of the first wall;

the aperture of the first coupling component comprises a bore extending between the third and the fourth sides of the first wall;

the retaining means is defined by the gap formed between the first side of the second wall, the third side of the first wall and a bed surface between said sides; and the gasket means is comprised of at least a pair of gaskets shaped to be positionable in the gap, a first gasket of the pair having a first top surface and the gasket being placeable in the gap onto the bed surface below a conduit passing through the gap with the first top surface facing outwardly from the gap; and a second gasket of the pair comprising a first bottom surface and a second top surface, the second gasket being placeable in the gap with the first bottom surface abutting the first top surface of the first gasket and the conduit in use, wherein the space between the first top surface and the first bottom surface defines the passage for the conduit to pass between the first and the second apertures.

In this arrangement the first and the second gaskets are sized and shaped so is to be received in the gap and the gaskets are deformable under compression so as to seal against the first side of the first wall about the bore formed therein and against the third surface of the second wall about the bore formed therein and to cause the first top surface of the first gasket and the first bottom surface of the second gasket to collapse against a conduit passing between the gaskets to form a leak-proof seal around the exterior of the conduit. Ideally, the cover means is operable to compress the first and the second gaskets axially between the bed surface and the underside of the cover means causing the gaskets to expand radially and seal against the first side of the second wall about the bore formed therein and the third side of the first wall about the bore formed therein and causing the first top surface of the first gasket and the first bottom surface of the second gasket to compress about a conduit passing therebetween to form a leak-proof seal around the exterior conduit or said first top surface and said first bottom surface.

In such an arrangement, the first and the second walls are ideally circular and the first and the second gaskets comprise O-rings receivable in the gap between the first side of the second circular wall and the third side of the first circular wall. As in the preferred embodiment, the cover means may comprise a lid couplable with a mating surface about the first open end of the housing.

The housing of the bulkhead connector assembly according to any of the described arrangements preferably comprises coupling means located about the second open end of the housing for sealingly connecting the housing to an opening of a bulkhead separating the two environments;

a flange portion comprising the mating surface and the first open end; and a coupling portion, comprising the second open end and the coupling means.

Conveniently, the means for securing the cover means to the housing comprises at least one bolt joint provided between the cover means and the mating surface of the housing, and the means for adjusting pressure exerted by the undersurface of the cover means towards the gasket means comprises at least one bolt joint provided between the cover means and the mating surface of the housing.

The gasket means according to any of the above-described arrangements is preferably deformable on compression so that in the absence of a conduit occupying it, the passage collapses wholly against itself to form a leak-proof seal between the gasket means and the apertures of the coupling components.

In still another embodiment, the cover means comprises a plug sized and shaped to be at least partially received in the channel of the housing. In this embodiment, the means for securing the cover means and the means for adjusting pressure exerted by the cover means comprise cooperating threads formed in the plug and the housing.

In one modification, the plug has an external thread and a corresponding internal thread is formed in the channel of the housing. In another modification the plug has a skirt extending from one end of the plug to the other so that in use when the plug is received in the channel, the skirt encompasses the housing, the skirt having a thread provided on its inner surface engageable with a matching thread formed in the exterior of the housing.

In one modification, the housing may be formed integrally with the bulkhead separating the two environments.

BRIEF DESCRIPTION OF THE DRAWINGS

The invention will now be described with reference to the accompanying drawings which show, by way of example only, three embodiments of the bulkhead connector with a wire sealing device according to the invention.

In the drawings:

FIG. 2 is a schematic partial illustration of the bulkhead connector of FIG. 1 showing an elastomeric gasket in a relaxed state;

FIG. 2a is an enlarged view of the gasket of FIG. 1 showing passages for feeding conduits formed through the bulkhead connector;

FIGS. 2b and 2c show alternative configurations of the passages for feeding conduits;

FIG. 2d shows a gasket collapsed against chamfered regions of the passages of FIG. 2b.

FIG. 3 is an enlarged view of area B of FIG. 1;

FIG. 3a is a view of a transverse section of an insulated wire shown in FIG. 3;

FIGS. 14 and 15 show cross-sectional elevations of the preferred embodiment of the bulkhead connector coupled with various external devices;

FIG. 16 is a plan view of the bulkhead connector of FIG. 15;

FIGS. 17 and 17a are schematic cross-sectional elevation and plan views of an alternative embodiment of the bulkhead connector of the invention;

FIG. 17b is a cross-sectional view along the lines E-E of FIG. 17;

FIG. 17c is a partial cross-sectional elevation of a housing of the bulkhead connector of FIG. 17;

FIGS. 18 and 18a are schematic cross-sectional elevation and plan views of another alternative embodiment of the bulkhead connector of the invention;

FIGS. 18b and 18c are enlarged views of areas F and G respectively of FIG. 18;

FIG. 18d is a plan cross-sectional view of a gasket and a wire of FIG. 18;

FIGS. 19 and 20 are cross-sectional elevations of first and second adaptors, respectively, which can be used with the bulkhead connector of the invention;

FIG. 20a is a plan view of a hoof-shaped clamp device used with the second adaptor of FIG. 20;

DETAILED DESCRIPTION OF PREFERRED EMBODIMENTS

Figure 1:
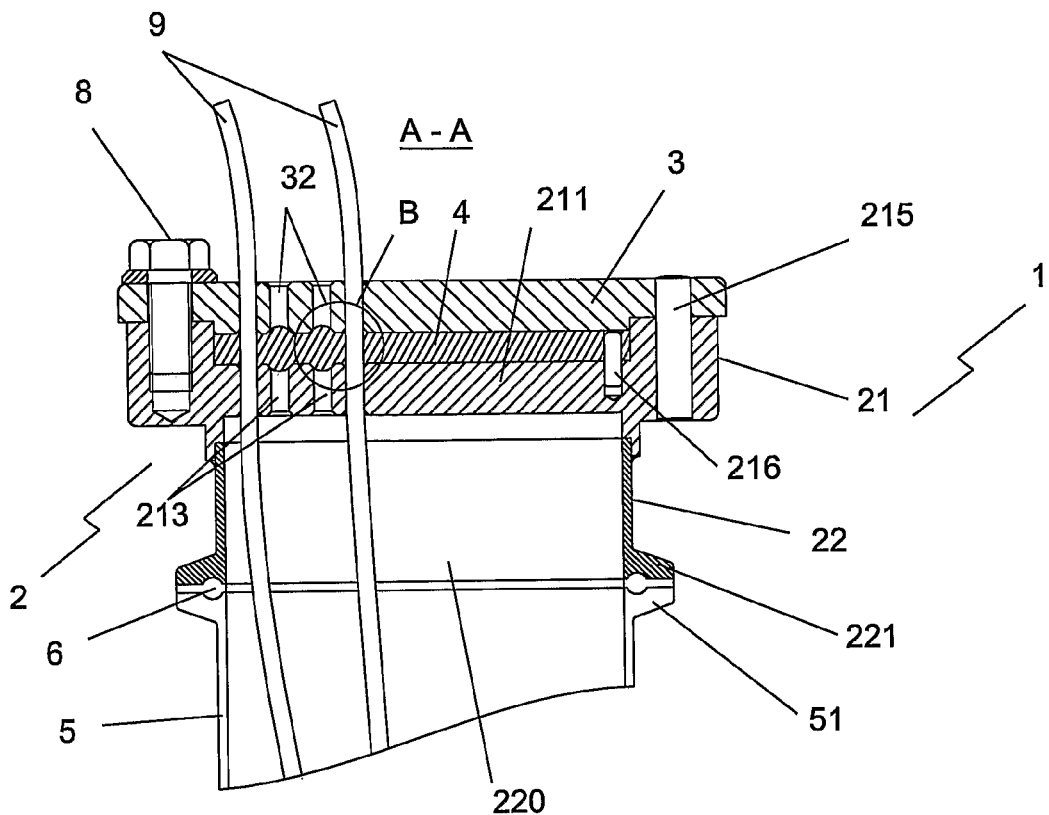
FIG. 1 is a cross-sectional schematic elevation along lines A-A of FIG. 1a of a preferred embodiment of the bulkhead connector according to the invention, the bulkhead connector being coupled with an external device to be fitted in a wall separating first and second environments.
Figure 1A:
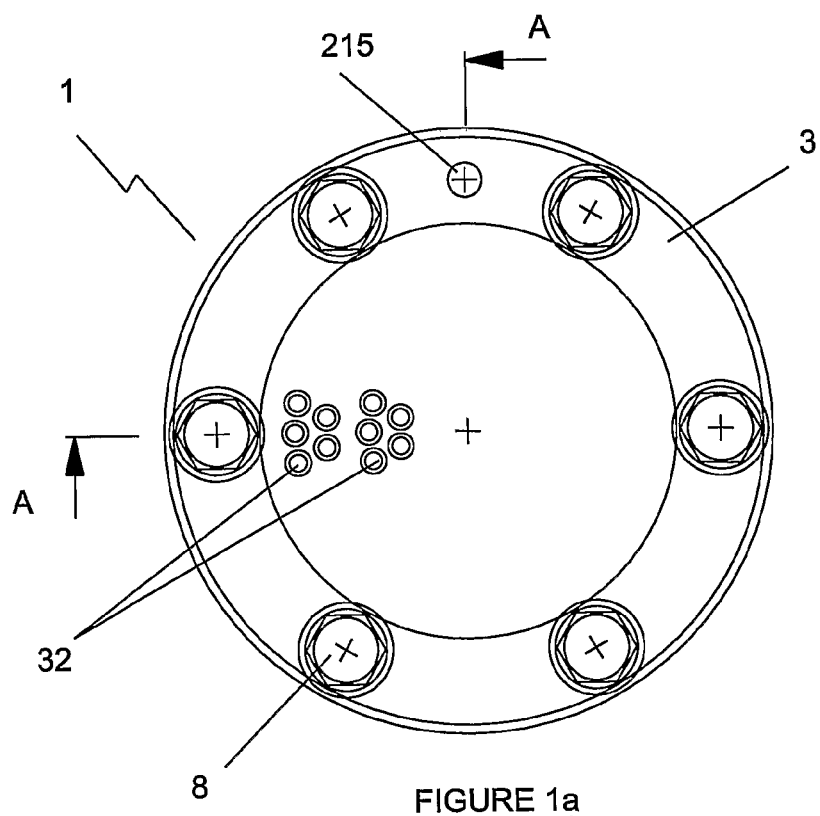
FIG. 1a is a plan view of the bulkhead connector of FIG. 1.

A most preferred embodiment of the bulkhead connector according to the invention will now be described with reference to FIGS. 1 to 16 and is indicated generally by reference numeral 1. The bulkhead connector 1 will be described by example in an application to a lyophilizing apparatus and more specifically to sealingly feeding insulated electrical conductors 9 of thermocouples through the bulkhead connector 1 from an environment with an atmospheric pressure into a vacuum chamber of the lyophilizer. It is to be understood that the application is not in any way limited to use in such an apparatus and in fact has application in any apparatus in which lines, conductors, piping or other conduits are to be lead, for any suitable reason, between two different areas or atmospheres which must be mutually Isolated.

Referring to FIGS. 1 to 16, the first embodiment of the bulkhead connector 1 comprises a tubular housing 2, a lid 3 securable to the housing and a resiliently deformable gasket 4 made of any suitable material. One suitable material is silicone having a hardness of about 40 durometers and other suitable materials will suggest themselves to the person skilled in the art. The gasket shown in the drawings is disc-shaped, but the invention is not limited to providing the gasket in this shape and many other configurations will be equally suitable for the purpose.

The housing 2 comprises a flange portion 21 and a coupler portion 22. The flange 21 has an open end 210 (FIG. 4a), a partition 211 which is formed integrally with the flange 21 and which blocks a through passage of the flange and a mating face 219. The partition has an upper surface 211 a facing the open end 210. A recess 212 at the open end 210 of the flange is sized and shaped to receive the gasket 4. The coupler portion 22 comprises an open end 220 about which a coupling flange 221 is provided. The coupling flange 221 shown in FIG. 1 is sealingly coupled with a matching flange 51 provided about an opening of a short tubular pipe 5 fitted to a bulkhead. An O-ring seal 6 is received in matching grooves of the flanges 221 and 51. The pipe 5 is hermetically fitted in a manner not shown in the drawings to a side wall of the vacuum chamber of a lyophilizer. Other known means can be utilized for coupling the bulkhead connector 1 to a fitting in a wall.

Figure 10:
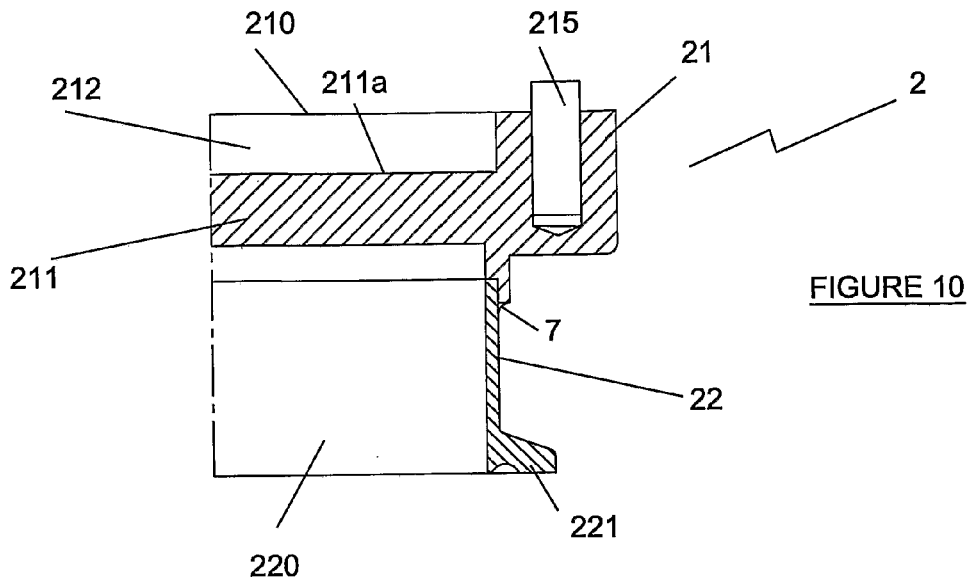
FIG. 10 is a partial cross-sectional elevation of a housing of the preferred embodiment of the bulkhead connector.

The flange 21 and the coupling portion 22 are bonded together by a weld joint 7 as shown in FIG. 10. Various other possibilities exist for connecting the flange 21 and the coupling portion 22, including forming them integrally. The partition 211 of the flange 21 has a plurality of though bores 213.

The gasket 4 also has a plurality of through bores 41. The diameter of the bores is selected such that when the gasket is in its relaxed state, the bore size matches the external transverse dimension of an insulation jacket 9a of a wire 9 intended to be received therein to enable the jacket to be fitted through the bore.

Plug portion 31 is formed on the underside of the lid 3, the plug 31 being receivable in the recess 212 of the flange 21. The depth H of the recess 212 Is less that the sum of the thickness I of the plug portion 31 and the thickness J of the gasket 4 in its relaxed state and gap K (see FIG. 2) is formed between a mating face 39 of the lid 3 and the mating face 219 of the flange 21 when the lid is placed over the open end 210 without compressing the gasket 4. Through bores 32 are formed in the lid 3.

The bores 213, 32 and 41 of the flange 21, the lid 3 and the gasket 4 respectively are alignable in use so as to form passages 12 (see FIG. 2a) through which insulated wires 9 of thermocouples are fed during the use of the bulkhead connector 1.

Diameters of the bores 213 and 32 are normally greater than the maximum external transverse dimension of a wire 9 intended to be received therein to ensure that the wires 9 pass freely through these bores. The diameter of the bores 41 will be selected to match the external transverse diameter of the wire to be fed through the bore and depending on the elasticity of the gasket material, the bore diameter may be somewhat smaller or somewhat larger than that of the wire, provided that it is possible to on the one hand feed the wire through the bore and on the other hand fed between the gasket and the wire on compression of the gasket.

Figure 4:
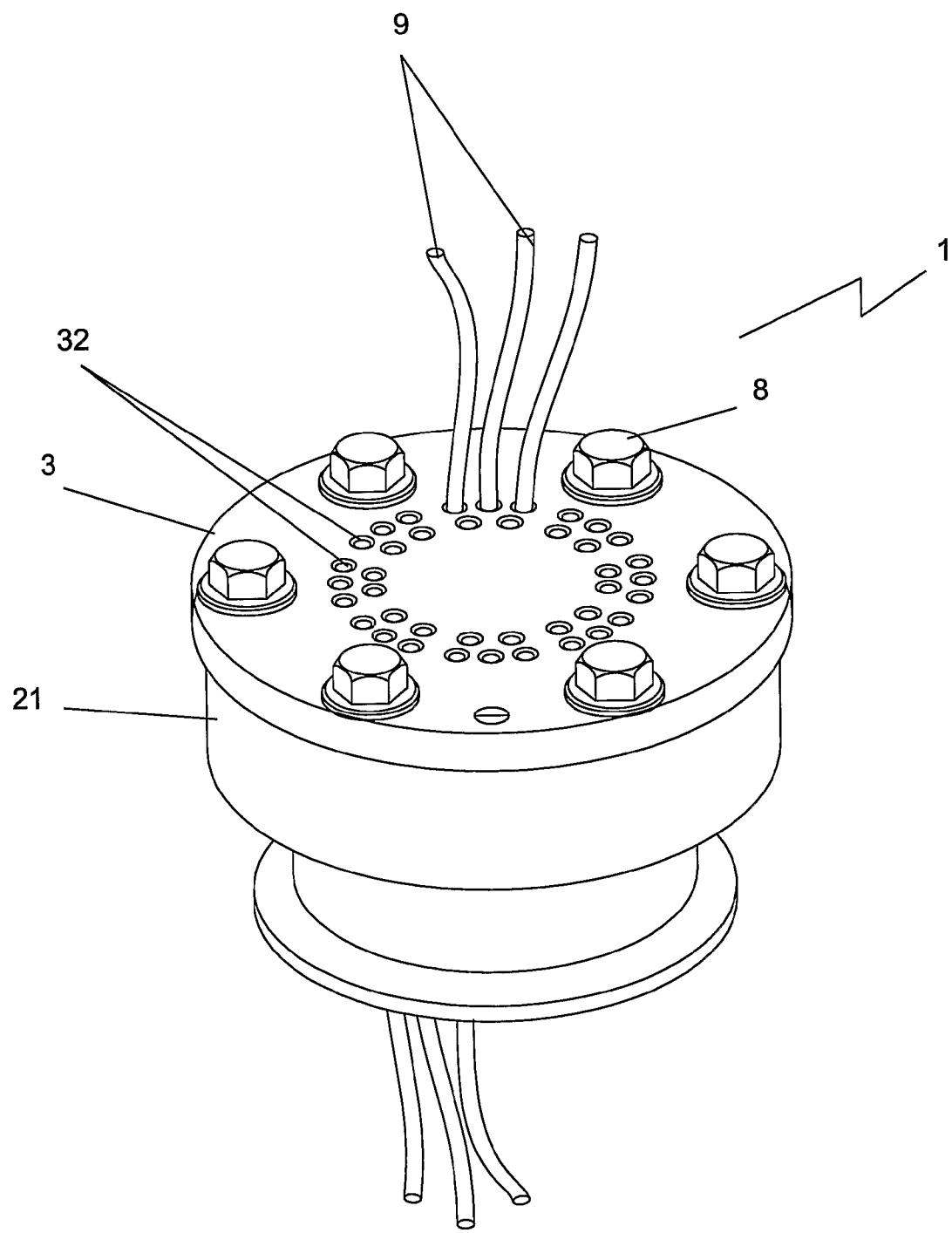
FIG. 4 is a perspective view of the preferred embodiment of the bulkhead connector.
Figure 4A:
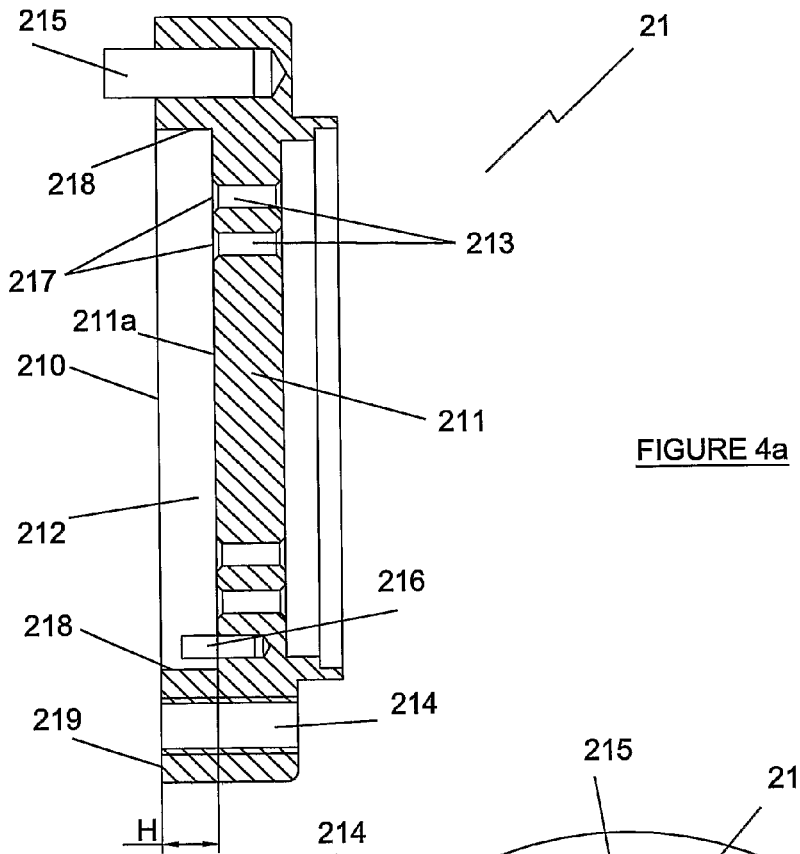
FIGS. 4a and 5 are cross-sectional elevation and plan views respectively of a flange portion of the preferred embodiment of the bulkhead connector.
Figure 5:
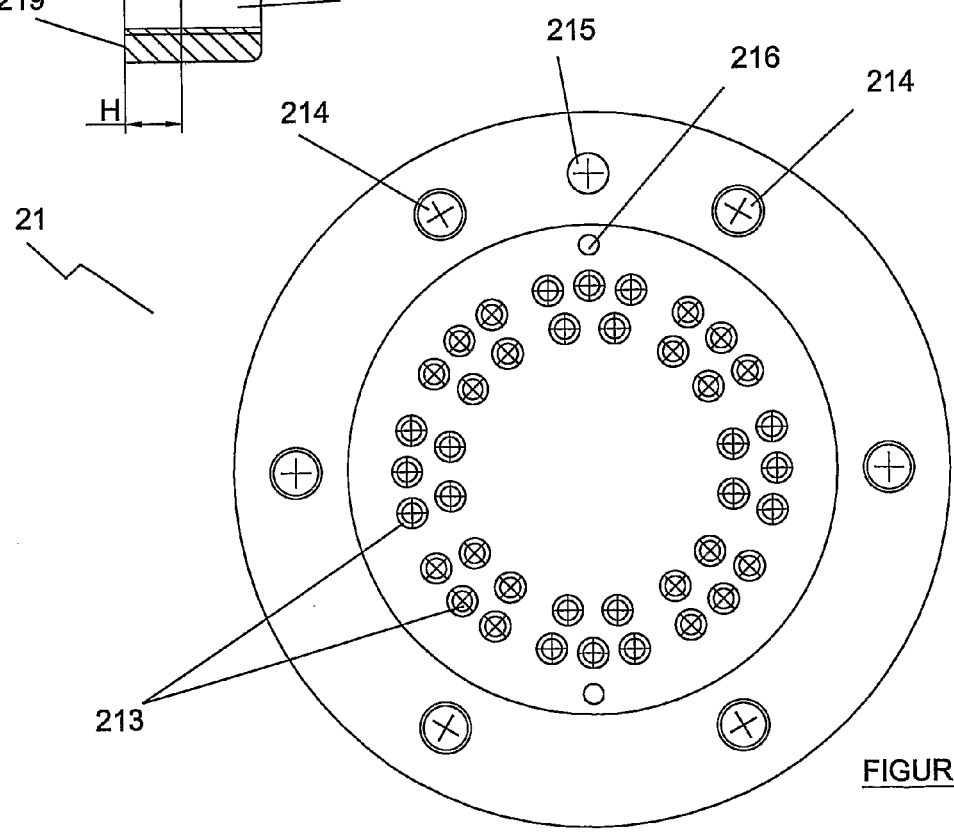
Figure 6:
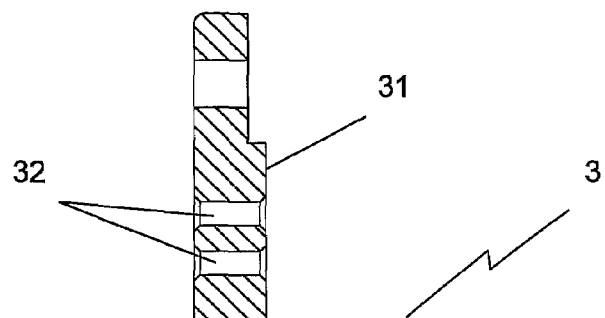
FIGS. 6 and 7 are cross-sectional elevation and plan views respectively of a lid of the preferred embodiment of the bulkhead connector.
Figure 7:
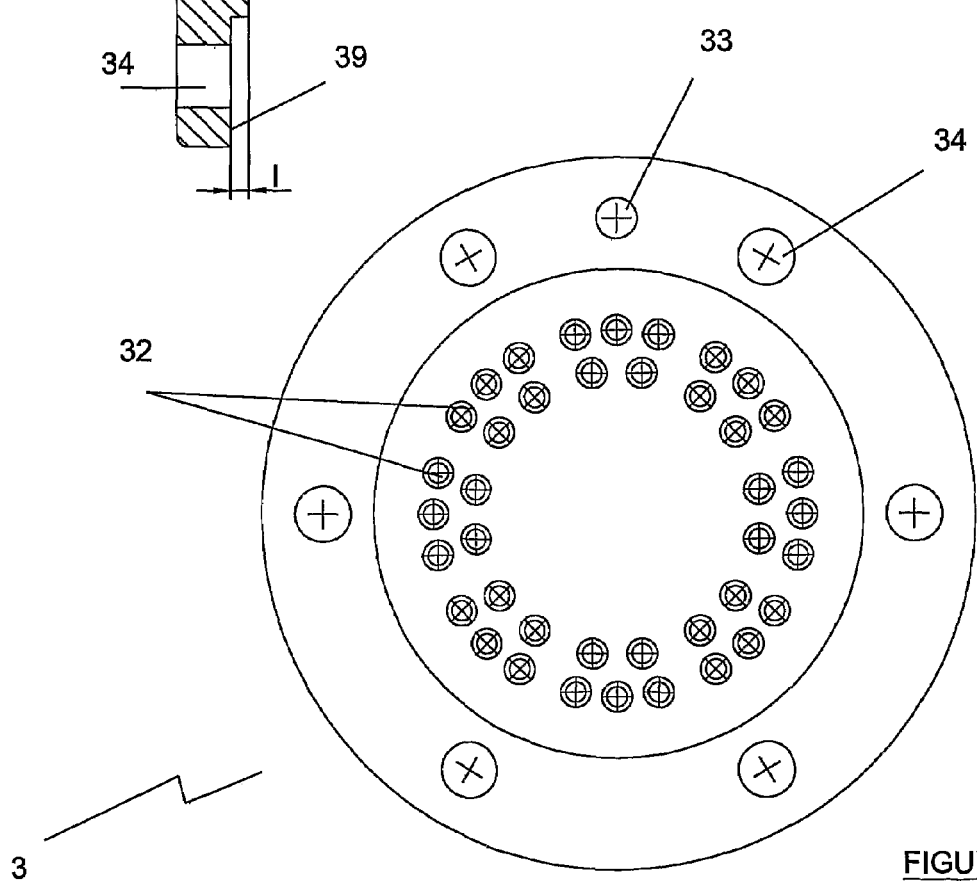
Figure 8:
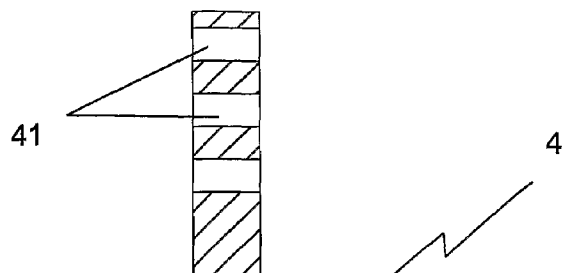
FIGS. 8 and 9 are cross-sectional elevation and plan view respectively of a gasket of the preferred embodiment of the bulkhead connector.
Figure 9:
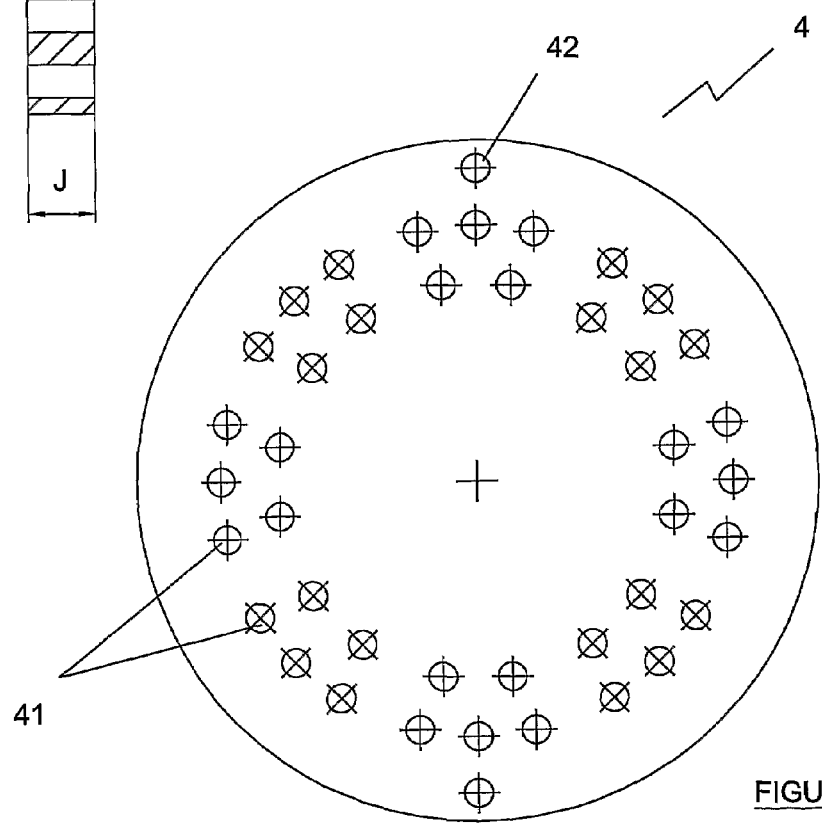

FIG. 4 shows an assembled bulkhead connector suitable for receiving up to forty wires. FIGS. 4a to 9 show the flange 21, the lid 3 and the gasket 4, each provided with forty bores 213, 32 and 41 respectively which are grouped so as to form a pattern of eight groups, each group consisting of five bores. This number of bores corresponds to the number of thermocouples utilized in a lyophilizer with a vacuum chamber having eight shelves. Each shelf receives working joints of five thermocouples, four of which are normally located at the four corners of the shelf and one in the centre. However, there is no restriction as to the number of the bores. Alignment of the bores 213 of the flange 21 with the bores 41 of the gasket 4 is assisted by the provision of a pair of locating pins 216 projecting from the partition 211 towards the open end 210. The pins 216 are engageable with corresponding holes 42 of the gasket 4. Alignment of the bores 32 of the lid 3 with the bores 41 of the gasket 4 is assisted by a locating pin 215 projecting axially from the flange 21 adjacent the open end 210. The pin 215 is engageable with a corresponding aperture 33 of the lid 3. Of course, other suitable means can be provided for aligning the bores of the flange, the gasket and the lid.

The lid 3 is further provided with bolt apertures 34 and is securable to the flange 21 by bolts 8 which are received in threaded apertures 214 of the flange 21. However, other known means can be provided for securing the lid to the flange.

The bores 213 of the flange 21 can be provided with chamfers 217 and the bores 32 of the lid 3 can be provided with chamfers 35 (see FIG. 2a). The purpose of the chamfers will be explained below. As shown in FIG. 2b the bores 213 can have a first chamfered region 250 proximal the gasket 4 in use and a second chamfered region 251 remote the gasket 4. Bores 32 of the lid 3 can be provided with similar first and second chamfered regions 350 and 351, respectively. FIG. 2d shows a gasket 4 collapsed against the chamfered regions 250, 251, 350 and 351. As shown in FIG. 2c the bores 32 and 213 can have fillets 360 and 260, respectively instead of chamfers.

The gasket 4 is compressable axially in the recess 212 between the lid 3 and the partition 211 thus flattening the gasket. The combination of the material and the configuration of the gasket 4 and the bores 41 is such so that, upon compression, the gasket 4 forms a leak-proof seal with the undersurface of the lid 3 about the bores 32 and with the upper surface 211a of the partition about the bores 213, and the gasket 4 expands radially so that peripheral regions of the gasket press against the wall 218 of the recess 212 of the flange 21, thereby forming a leak-proof seal with the wall 218. At the same time, the walls of the bores 41 of the gasket 4 contract towards their longitudinal axes causing them to press against insulation jackets 9a of wires 9 passing through the bores 41 forming a leak-proof seal around the insulation jackets 9a. The combination of the material and the configuration of the gasket 4 is also such that the walls of the bores 41, which have no wires passing therethrough, can contract radially against themselves so as hermetically to block the lumens of the bores 41. Although it is possible for all the bores 41 to sealingly collapse against themselves in the absence of a wire passing therethrough, it is preferred to rely on this collapsibility function of the bores 41 only when a few bores of the overall number are unoccupied.

In use, initially the components of the bulkhead connector 1 are assembled. The gasket 4 is placed into the recess 212 of the flange 21 and located on the pins 216 and the lid 3 is placed over the open end 210 of the flange 21 and located on the pin 215. The lid 3 is then pre-secured to the flange 21 by the bolts 8 in such a manner that the gasket remains in the relaxed state. Next, the required insulated wires 9 of thermocouples are fed through the passages 12 formed by the aligned bores 32, 41 and 213 of the lid 3, the gasket 4 and the flange 21 respectively.

Figure 11:
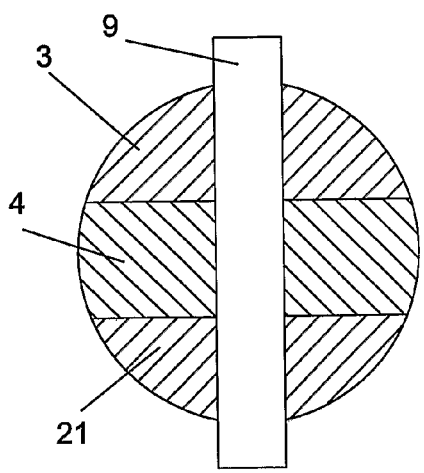
FIG. 11 is a schematic cross-sectional elevation showing an insulated wire passing though a channel in the preferred embodiment of the bulkhead connector.
Figure 12:
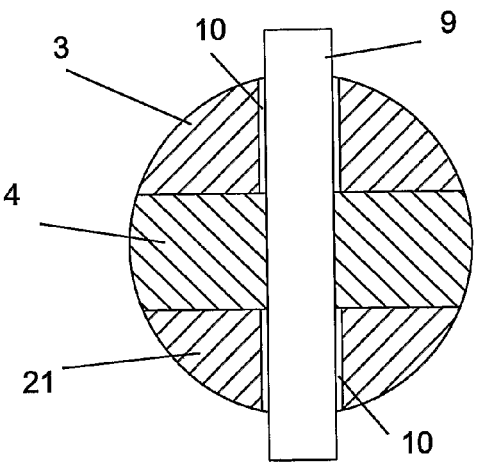
FIGS. 12 and 13 are side and plan cross-sectional views respectively of FIG. 11.
Figure 13:
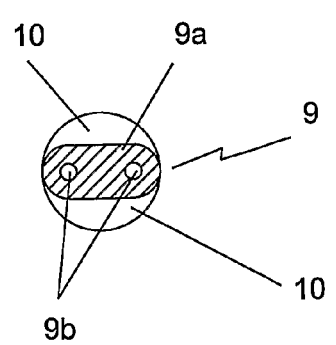

A wire 9 passing through the passage while the gasket is in a relaxed state is schematically shown in FIGS. 11 to 13. The wires 9 have two electrical conductors 9b contained in a single insulation jacket 9a. However, the bulkhead connector I is not restricted for receiving only such wires. Nor indeed need the article fed through the bores be an electrical conductor, but it could be any other desired conduit for any suitable purpose.

The bolts 8 are then tightened causing the lid 3 to press against the gasket 4. The gasket 4 is compressed axially under the pressure of the lid 3 between the partition 211 and the lid 3 which causes the gasket 4 to expand radially so that the peripheral regions of the gasket 4 press against the wall 218 of the recess 212 of the flange 21 forming a leak-proof seal around the wall of the recess 212. At the same time, as shown in FIG. 3, the walls of the bores 41 of the gasket 4 contract towards their longitudinal axes pressing against insulation jackets 9a of wires thus forming leak-proof seals around the wires 9. The walls of unoccupied bores 41 contract radially inwardly and close, thus hermetically blocking the lumens of the bores 41.

The bolts are tightened until the mating surface 39 of the lid 3 and the mating surface 219 of the flange 21 abut each other so as to ensure that the gasket 4 is compressed. In practice, a user assembling the bulkhead connector will conduct a visual inspection to ensure that there is no gap between mating surfaces 39 and 219 of the lid 3 and the flange 21 respectively, absence of a gap being indicative that the gasket 4 is being sufficiently compressed by the undersurface of the lid the so as to form the leak-proof seal around the wires 9.

Chamfers 217 and 35 of the flange 21 and the lid 3 respectively counterpoise axial expansion of the gasket 4 into gaps 10 between the wires 9 and the walls of the bores 213 and 32 and create inwardly directed forces in regions of contact of the gasket material with the chamfers 217 and 35 which intensify the sealing effect around the wires 9. These forces are shown by arrows in FIG. 3.

The assembled bulkhead connector 1 is then normally passed through a calibration step, during which the thermocouple wires 9 are tested to ensure that they can produce adequate measurements. Upon the calibration, the wires 9 coming out of the open end 220 are advanced through the pipe 5 into the vacuum chamber of the lyophilizer. The coupling flange 221 is then sealingly coupled with the flange 51 of the pipe 5 and secured by suitable means, such as a tri-clover fitting.

FIGS. 14 and 15 show examples of two different pipes 5 with which the bulkhead connector 1 can be coupled, and many other constructions for making the connection are possible. An eighty-bore pattern of the lid 3 is illustrated in FIG. 16.

An alternative embodiment of the bulkhead connector of the invention is illustrated in FIGS. 17 to 17c and is indicated generally by reference numeral 300. The bulkhead connector 300 comprises a tubular housing 320, a lid 330 securable to the housing and a pair of resiliently deformable annular gaskets 340 and 341. The housing 320 comprises a first open end 301, a second open end 302 and a passage 303 extending between the ends. The housing further comprises a flange portion 321 and a coupler portion 322. The coupler portion 322 and the means for coupling it with a fitting in a wall are substantially the same as described above with reference to the bulkhead connector 1. A groove 323 is defined by a space formed between concentric walls 324 and 325 projecting around the circumference of the flange 321. Through bores 324a and 325a for receiving wires 9 are formed in the walls 324 and 325 respectively. The gaskets 340 and 341 are in a form of O-rings sized to be received in the groove 323, one gasket being placed on top of the other. The lid 330 is provided with a collar portion 331 on its underside, the collar portion being receivable in the groove 323. The lid is securable to the flange by bolts 80.

In use, initially the components of the bulkhead connector 300 are assembled. One of the gaskets, for example 340, is placed on the base of the groove 323. Next, the required insulated wires 9 are fed first into the bores 324a and then through the bores 325a so that the wires pass across the groove 323 and enter the passage 303 of the housing. The other gasket, for example, 341 is placed into the groove 323 over the wires 9. The lid 330 is then placed over the open end 301 of the flange with the collar 330 projecting into the groove 323. The bolts 80 are then tightened causing the collar 330 to press against the gasket 341. This compresses both gaskets 341 and 340 causing the gaskets to expand radially in the groove 323 forming a leak-proof seal with the wall 324 about the bore 325a and with the wall 324 about the bore 324a. The compression of the gasket further causes the faces of the gaskets facing towards the wires 9 to deform and envelop the wires 9 passing between the gaskets (see FIG. 17b) thus forming a leak-proof seal around the wires. At the same time, the faces of the gaskets facing towards the wires 9 also close together to fill any void spaces between the faces and thus forming a leak-proof seal between the faces.

A further alternative embodiment of the bulkhead connector of the invention is illustrated in FIGS. 18 to 18d and is indicated generally by reference numeral 400. The bulkhead connector 400 comprises a tubular housing 420, a lid 430 securable to the housing and a plurality of resiliently deformable gaskets 440. The housing 420 comprises a first end 401 and a second end 402. The second end 402 is open and comprises a coupler portion 422. The coupler portion 422 and the means for coupling it with a fitting in a wall are substantially the same as described with reference to the bulkhead connector 1. The first end 401 is closed by a flange 421. Through bores 423 for receiving wires 9 are formed between the outer surface and the underside of the flange 421. A recess 424 is formed around each bore 423 on the outer surface of the flange. The gaskets 440 are in a form of O-rings sized to be received in the recesses 424 and are sized so that when located in the recesses, in their relaxed state, parts of the gaskets 440 project proud of the recesses 424. The lid 430 is provided with a plurality of through bores 431 formed between the outer surface and the underside of the lid 430. The bores 431 are alignable with the bores 423 of the flange 421 so as form passages through which insulated wires 9 are fed during the use of the bulkhead connector 400. The lid 430 is securable to the flange 421 by bolts 800.

In use, initially the components of the bulkhead connector 400 are assembled. Gaskets 440 are placed into the recesses 424. Next, the lid 430 is placed over the parts of the gaskets 440 projecting from the recesses 424 with the bores 431 of the lid being positioned in register with the bores 423 of the flange 421 (see the left half of FIG. 18). The lid is then pre-secured to the flange 421 by the bolts 800. The required insulated wires 9 are then fed through the passages formed by the bores 423 of the flange and the bores 431 of the lid and pass into the interior of the housing 420. The bolts 800 are then tightened causing the lid 430 to press against the gaskets 440. Compressing the gaskets 440 axially causes the gaskets 440 to form a leak-proof seal with the undersurface of the lid 430 about the bores 431 of the lid and with the bases of the recesses 424 about the bores 423. The compression of the gaskets 440 further causes them deform about the wires 9 passing through the gaskets thus forming a leak-proof seal around the wires. At the same time, the gaskets 440 also fill any void space intermediate the recesses 424 and the underside of the lid 430 thus forming leak-proof seals in the recesses 424.

Sometimes an opening of a device to which a bulkhead connector of the invention is to be coupled Is not compatible with the coupling flange 221 of the bulkhead connector. For example the opening may comprise a port 89 (FIG. 19) having an internal pipe thread. In such case, an adaptor 90 may be used. One end of the adaptor 27 comprises a commercially available coupling flange 91 matching the flange 221 and the other end has a length of pipe 92 with external pipe thread matching the thread of the port 89. The flange 91 and the length of pipe 92 can be, for example, welded together at their respective meeting ends 93 and 94. In use, the threaded end of the adaptor 90 is screwed into the threaded opening of the port 89.

The opening may comprise a port 95 having a flange 96 not matching the coupling flange 221 of the bulkhead connector. FIG. 20 shows a second adaptor 97 comprising a first flange 98 matching the flange 221 at one end and a second flange 99 matching the flange 95 of the port 95 at the other end. In use, the flanges 96 and 99 are placed together in register and clamped by a suitable clamping device such as for example a hoof-shaped clamp device 100 (FIG. 20a).

Figures 21, 21A:
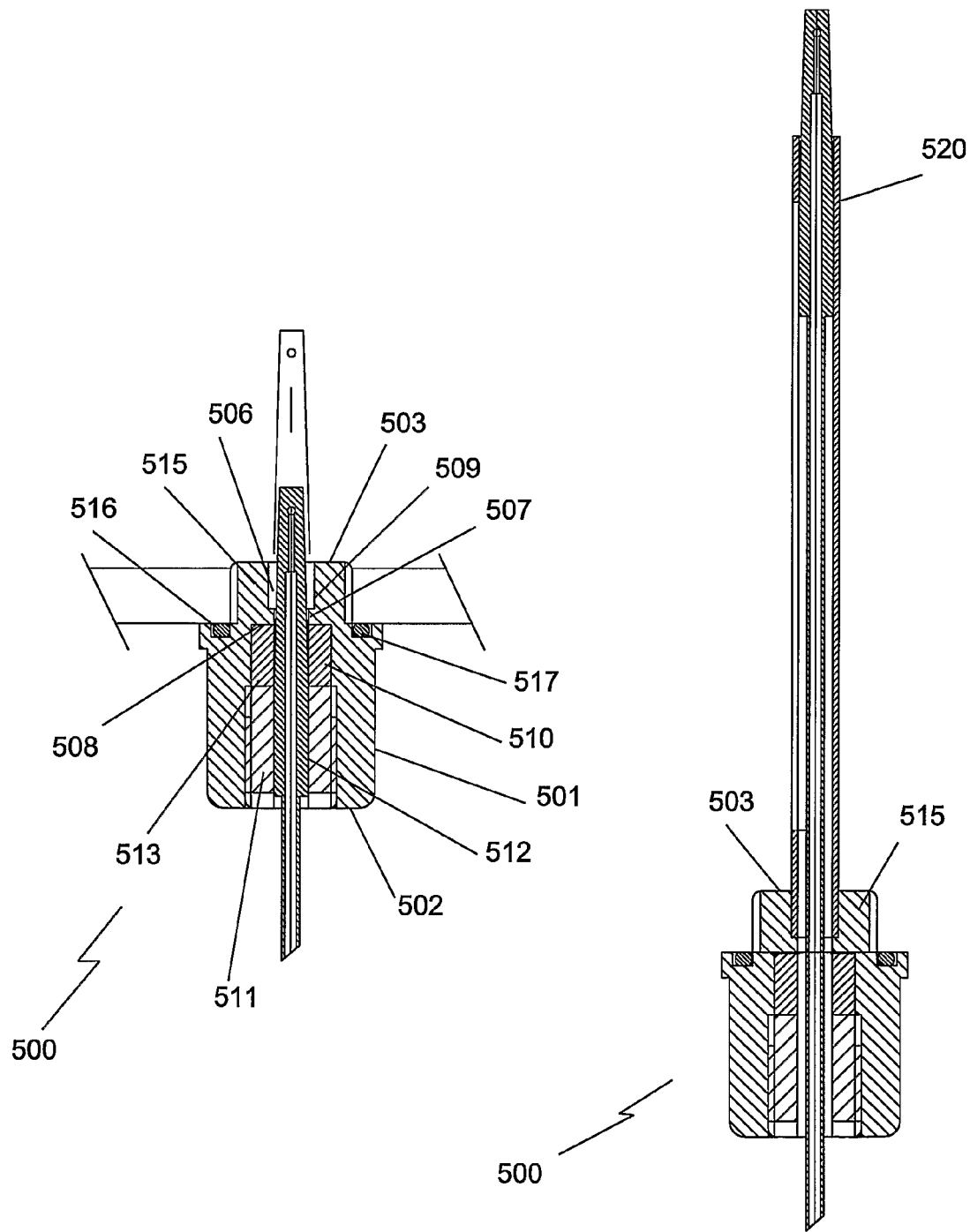
FIG. 21 is a cross-sectional elevation of yet another alternative embodiment of a bulkhead connector according to the invention.
FIG. 21a is a cross-sectional elevation of the bulkhead connector of FIG. 21 having an extension tube attached thereto.
Figure 22:
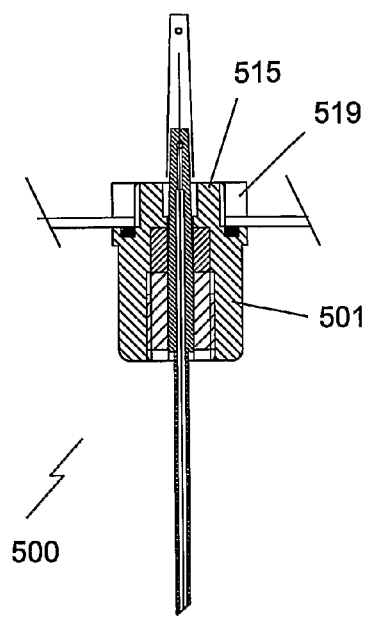
FIG. 22 is a cross-sectional elevation of the bulkhead connector of FIG. 21 secured in position by a nut.
Figure 23:
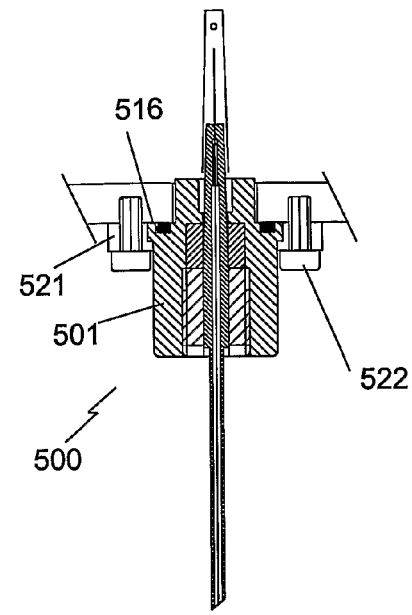
FIG. 23 is a cross-sectional elevation of a bulkhead connector similar to that of FIG. 21 but having a flange for securing the bulkhead connector in position.

A still further embodiment of the bulkhead connector of the invention is shown in FIGS. 21 to 23 and is indicated generally by reference numeral 500. This embodiment is preferably used for sealingly feeding a single conduit between two environments but is not limited to such a single conduit. Such a single conduit bulkhead connector is suitable for feeding a thermocouple to an environment where measurements taken by a single thermocouple are sufficient, e.g. at a certain distance from a wall of a pipe or a vessel. The bulkhead connector 500 comprises a housing 501 having a first open end 502, a second open end 503 and a passage 506 extending between the ends for feeding a thermocouple therethrough. The inner wall 509 defining the passage 506 has a ledge 507 intermediate the ends 502 and 503. The ledge 507 has an end face 508 facing the first end 502 and together with the wall 509 defines a recess 513 sized and shaped for receiving a gasket in a form of resiliently deformable ring 510 which in use abuts against the end face 508. A plug 511 having a through channel 512 for receiving a thermocouple is cooperatively received in the recess 513 for compressing the ring 510. On compression, the ring 510 forms leak-proof seals with the exterior of the thermocouple, the wall 509, the end face 508 and an inner face 514 of the plug 511. In this embodiment, the plug 511 has an external thread cooperating with an internal thread in the recess 513 for securing the plug in the recess and for advancing the plug towards the ring 510. The housing 501 has a mating face 516 proximal the second open end and a threaded end portion 515 projecting proud from the mating face 516. In use, the threaded portion 515 is screwed into a matching opening in a wall separating the two environments, such as a wall of a pipe, vessel or any other relevant device. An optional sealing ring 517 may be placed between the mating face 516 and the separating wall into a matching groove formed in the mating face 516. If the thermocouple sensor end is to be placed remote from the separating wall, an open ended extension tube 520 may be attached to the second end 503 of the housing 501 as shown in FIG. 21a. The thermocouple can then be advanced along the tube so that the sensor end of the thermocouple projects from the tube 520 distal from the housing 1.

If the separating wall is relatively thin, the threaded portion 515 may be secured by a nut 519 at the side of the wall facing the second environment, as shown in FIG. 22. Furthermore, the end portion 515 and the opening in the separating wall need not necessarily be threaded. As shown in FIG. 23, the housing 501 may have a flange 521, which includes the mating face 516. The housing 501 can be secured to the separating wall by the flange 521 with suitable fastening means such as for example bolts 522.

Figure 24:
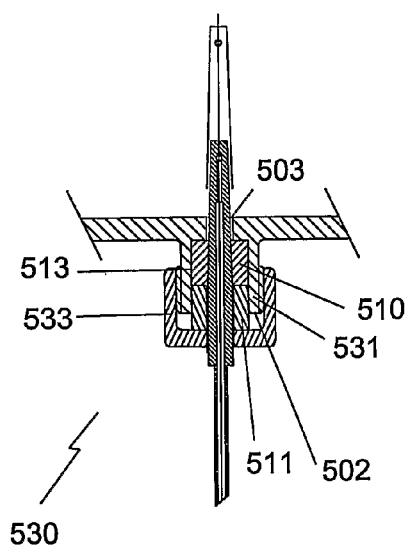
FIG. 24 is a cross-sectional elevation of a still further alternative embodiment of a bulkhead connector according to the invention.
Figure 25:
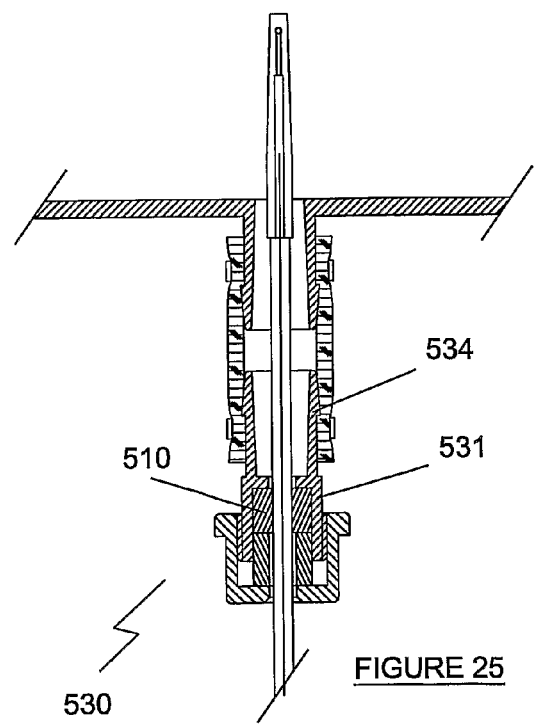
FIG. 25 is a cross-sectional elevation of a bulkhead connector similar to that of FIG. 24 but having a barbed fitting for connecting the bulkhead connector to a hose.

FIG. 24 shows a still further embodiment of the bulkhead connector of the invention indicated generally by reference numeral 530. The bulkhead connector 530 is similar to the above-described bulkhead connector 500, and like elements are indicated by the same numerals. The bulkhead connector 530 differs from the bulkhead connector 500 in that the bulkhead connector 530 has a housing 531 formed integrally with the separating wall. A plug 532 differs from the plug 511 in that it is slidably received in the recess 513 of the housing 531 and has a skirt 533 which encompasses the exterior of the housing 531 about the first open end 502. The skirt 533 cooperates with the housing 531 via matching threads formed in the inner surface of the skirt and the exterior of the housing. The housing 531 however need not be integrally formed with the separating wall. As shown in FIG. 25 the housing 531 may have a barbed fitting at the second end 503 connectable to a flexible hose which in turn is connectable to a similar barbed fitting about the opening of the separating wall.

Although the bulkhead connectors described above including the housings, the lids and the gaskets are circular in cross-section, they can be of any suitable shape as long as it does not affect the sealing action of the bulkhead connectors.

Any suitable materials can be selected for the housings 2, 320, 420, 501 and 531, the lids 3, 330 and 430 and the plugs 511 as long as the regions of the above components which in use are in contact with corresponding gaskets 4, 340, 341, 440 and 510 are sufficiently rigid to enable compression of the gaskets in order to form leak-proof seals with these regions and with any conduits occupying the passages of the gaskets. The dimensions of the gasket and the surrounding elements of the connector are selected and matched to ensure that no void spaces exist in the gap space between the two environments on compression of the gasket.

It is thought that the present invention and its advantages will be understood from the foregoing description and it will be apparent that various changes may be made thereto without departing from the scope of the invention as defined by the appended claims, the forms hereinbefore described being merely preferred or exemplary embodiments thereof.

What is claimed is:

1. A bulkhead connector (1, 300) assembly for sealingly feeding a conduit (9) between first and second environments, the connector (1, 300) including means (221, 90, 100) for attachment to a bulkhead separating the two environments in use and comprising:

a first coupling component (3, 324) having a first surface and a second coupling component (211, 325) having a second surface, the first and second coupling components being mutually spaced apart so as to provide a gap (212, 323) between the first and second surfaces, each said component having at least one aperture (32, 213, 324a, 325a) for receiving a conduit (9) therethrough, such that the conduit (9) can enter the gap (212, 323) via the at least one aperture of one of the two coupling components and exit the gap via the aperture of the other coupling component, the aperture (32, 324a) of the first coupling component (3, 324) extending between the first surface and the first environment and the aperture (213, 325a) of the second coupling component (211, 325) extending between the second surface and the second environment;

a gasket means (4, 340, 341) comprised of a resiliently deformable material positionable between the first and second surfaces about the apertures (32, 213, 324a, 325a) of the coupling components and defining a plurality of passages (41), each passage being configured for receiving a conduit (9) to pass through the gasket means;

wherein the bulkhead connector further comprises means (3, 330) for compressing the gasket means (4, 340, 341), the material of the gasket means being deformable on compression so as to seal against the first and second surfaces about the apertures of the coupling components (3, 211, 324, 325) and against any conduit (9) occupying any of the passages (41) to form a leak-proof seal around the exterior of the or each conduit to prevent any fluid from passing from one aperture to the other along the exterior of the or each conduit, and the gasket means being deformable on compression so that in the absence of a conduit (9) occupying any one or more of the passages (41), that passage collapses wholly against itself to form a leak-proof seal between the gasket means and the apertures (32, 213, 324a, 325a) of the coupling components.

2. A bulkhead connector (1, 300) assembly as claimed in claim 1, further comprising:
 a housing (2, 320) having first and second open ends (210, 220, 301, 302) and a channel extending between the ends; the channel being defined by a first wall (218)
 the second end (220, 302) being sealingly attachable to an opening in the bulkhead leading into the second environment;
 the housing (2, 320) comprising means (211a, 218, 323) for retaining the gasket means (4, 340, 341), said retaining means being adapted for receiving the gasket means so that a region of the gasket means remains exposed to the first environment in the absence of the compressing means (3, 330); and the compressing means comprising:
 a cover means (3, 330) having an outer surface and an undersurface, the cover means (3, 330) being positionable over the first open end (210, 301) of the housing (2, 320) so that the undersurface of the cover means is in contact with said exposed region, and the outer surface of the cover means is exposed to the first environment; and
 means for securing the cover means to the housing in contact with the gasket means.

3. A bulkhead connector (1, 300) assembly as claimed in claim 2, including means (8, 80) for adjusting the pressure exerted by the undersurface of the cover means (3, 330) towards the gasket means (4, 340, 341).

4. A bulkhead connector (1) assembly as claimed in claim 3, wherein the second coupling component comprises a partition (211) located across the channel of the housing (2), said partition (211) blocking said channel, the partition having a first face (211a) facing the first open end (210) of the housing and a second face facing the second open end (220) of the housing;
 the cover means (3) comprises the first coupling component, said undersurface of the cover means comprising said first surface;
 the aperture of the first coupling component comprises a bore (32) extending between the undersurface and the outer surface of the cover means (3); and
 the gasket means comprises a gasket (4) sized and shaped and positionable in the gap so as substantially to occupy the gap space, the gasket passage comprising a through-bore (41) having open ends, one end facing the first surface and the other end facing the second surface when the gasket is positioned in the gap.

5. A bulkhead connector (1) assembly as claimed in claim 4, wherein the second surface is defined by the first face (211a) of the partition (211);
 the aperture of the second coupling component comprises a bore (213) extending between the first face (211a) of the partition and the second face of the partition;
 the retaining means comprises the first face (211a) of the partition and the first wall (218) of the channel of the housing (2); and
 the cover means (3) is placeable over the first open end (210) of the housing (2) with the undersurface of the cover means facing towards the first face (211a) of the partition so as to provide the gap defined by the first face (211a) of the partition, the first wall (218) of the channel of the housing and the undersurface of the cover means (3).

6. A bulkhead connector (1) assembly as claimed in claim 5, wherein the cover means (3) is operable to compress the gasket (4) axially in the gap causing the gasket to form a leak-proof seal with the undersurface of the cover means about the bore (32) of the cover means and with the First face (211a) of the partition (211) about the bore (213) of the partition and causing the gasket (4) to expand radially towards the first wall (218) of the channel of the housing forming a leak-proof seal with said channel wall, and radially to compress it about a conduit (9) occupying the through-bore (41) of the gasket to form a leak-proof seal around the conduit (9).

7. A bulkhead connector (1) assembly as claimed in claim 5, wherein a first chamfer (217) is provided at the opening of the bore (213) of the partition (211) on the first face (21a) of the partition and a second chamfer (35) is provided at the opening of the bore (32) of the cover means (3) on the undersurface of the cover means, the chamfers (217, 35) being provided for the purpose of counterpoising pressure exerted by the gasket (4) on compression of the gasket and redirecting said pressure toward the bore (41) of the gasket.

8. A bulkhead connector (1) assembly as claimed in claim 5, wherein the cover means comprises a lid (3) and the housing (2) includes an end face having a mating surface (219) about the first open end (210) and the undersurface of the lid is defined by a coupling surface (39) for coupling with the mating surface (219) of the housing (2) and by a central plug portion (31) projecting proud of the coupling surface (39), the plug portion being received in the first open end of the housing for compressing the gasket axially in the gap.

9. A bulkhead connector (1, 300) assembly as claimed in claims 8, wherein the means for adjusting pressure exerted by the undersurface of the lid (3, 330) towards the gasket means (4, 340, 341) comprises at least one bolt joint (8, 80) provided between the lid and the mating surface of the housing (2, 320).

10. A bulkhead connector (300) assembly as claimed in claim 2, wherein the second coupling component comprises a second continuous wall (325) projecting proud of a mating surface of the housing (320), the second wall (325) having a first side facing towards the periphery of the mating surface and a second side facing towards the centre of the first open end (301) of the housing;
 the second surface being defined by the first side of the second wall (325);
 the aperture of the second coupling component comprising a bore (325a) extending between the first and the second sides of the second wall (325);
 the first coupling component comprises a first continuous wall (324) offset radially outwardly from the second wall (325) and projecting proud of the mating surface of the housing (320), the first wall (324) having a third side facing towards the centre of the first open end (301) of the housing and a fourth side facing towards the periphery of the mating surface;
 the first surface being defined by the third side of the first wall (324);
 the aperture of the first coupling component comprises a bore (324a) extending between the third and the fourth sides of the first wall (324);
 the retaining means is defined by a gap (323) formed between the first side of the second wall (325), the third side of the first wall (324) and a bed surface between said sides; and
 the gasket means is comprised of at least a pair of gaskets (340, 341) shaped to be positionable in the gap (323), a first gasket (340) of the pair having a first top surface and the gasket being placeable in the gap (323) onto the bed surface below a conduit (9) passing through the gap with the first top surface facing outwardly from the gap; and a second gasket (341) of the pair comprising a first bottom surface and a second top surface, the second gasket (341) being placeable in the gap with the first bottom surface abutting the first top surface of the first gasket and the conduit in use, wherein the space between the first top surface and the first bottom surface defines the plurality of passages for conduits (9) to pass between the first and the second apertures.

11. A bulkhead connector (300) assembly as claimed in claim 10, wherein the cover means (330) is operable to compress the first and the second gaskets (340, 341) axially between the bed surface and the underside of the cover means (330) causing the gaskets to expand radially and seal against the first side of the second wall (325) about the bore (325*a*) formed therein and the third side of the first wall (324) about the bore (324*a*) formed therein and causing the first top surface of the first gasket (340) and the first bottom surface of the second gasket (341) to compress about a conduit (9) passing therebetween to form a leak-proof seal around the exterior of the conduit (9) or said first top surface and said first bottom surface, the first faces of the gaskets also closing together to fill any void spaces between the faces, thereby forming a leak-proof seal between the faces.

12. A bulkhead connector (300) assembly as claimed in claim 11, wherein the first and second walls (324, 325) are circular and the first and second gaskets comprise O-rings (340, 341) receivable in the gap (323) between the first side of the second circular wall and the third side of the first circular wall.

13. A bulkhead connector (300) assembly as claimed in claim 10, wherein the cover means comprises a lid (330) couplable with a mating surface of an end face of the housing (320) about the first open end (301).

\* \* \* \* \*